United States Patent [19]

Klatt

[11] Patent Number: 4,692,618

[45] Date of Patent: Sep. 8, 1987

[54] DETECTOR SIGNAL CONDITIONER

[75] Inventor: Robert W. Klatt, Rancho Palos Verdes, Calif.

[73] Assignee: Hughes Aircraft Company, Los Angeles, Calif.

[21] Appl. No.: 729,825

[22] Filed: May 2, 1985

[51] Int. Cl.$^4$ ............................................... G01J 5/26
[52] U.S. Cl. .................................... 250/330; 250/332; 250/334; 250/338
[58] Field of Search ............ 250/334, 332, 330, 336.1, 250/338 R; 343/17; 367/7; 307/546, 547, 555, 556, 562; 342/53, 179

[56] References Cited

U.S. PATENT DOCUMENTS

| | | | |
|---|---|---|---|
| 3,895,305 | 7/1975 | Longman, Jr. ........................ | 328/171 |
| 4,316,103 | 2/1982 | Nathanson ............................ | 307/304 |
| 4,450,479 | 5/1984 | Horne .................................... | 358/113 |

FOREIGN PATENT DOCUMENTS 3325925  2/1985  Fed. Rep. of Germany ...... 250/338

Primary Examiner—Janice A. Howell
Assistant Examiner—Constantine Hannaher
Attorney, Agent, or Firm—L. B. Sternfels; R. L. Taylor; A. W. Karambelas

[57] ABSTRACT

In a system for imaging radiation of a subject (14), particularly infrared radiation, the radiation scanned past a set of detectors (12), each of which produces an output signal amplified by an individual amplifying channel. Each amplifying channel includes a forward amplifier (38) and a feedback amplifier (50), the latter driving a diode (46) to limit excursion of a detector signal to an amplitude which is sufficiently small to avoid saturation of the forward amplifier. The forward amplifier (38) is AC coupled between a detector (12) and an output display (18), the limiting action of the diode (46) preventing the buildup of excessive charge on the coupling capacitors (40, 42), thereby to permit a viewing of fine detail superposed on coarse detail of the subject being viewed. A low-pass filter (48) in the feedback branch provides a delayed response to the limiting action which permits the passage of high-frequency detail to be imaged on the display (18).

9 Claims, 3 Drawing Figures

DETECTOR SIGNAL CONDITIONER

BACKGROUND OF THE INVENTION

This invention relates to radiation imaging systems and, more particularly, to an imaging system employing a radiation scanner with an array of infrared detectors in combination with signal conditioning circuitry employing AC (Alternating Current) coupled amplifiers wherein each amplifier is provided with a feedback circuit and a limiter operated by the feedback circuit to reduce detector voltage excursion of large targets, thereby to enhance the visibility of relatively small targets in the presence of the large targets.

One well-known form of infrared imaging systems employs an array of infrared detectors and a lens for directing rays of radiation from a portion of a scene being viewed by the array of detectors. Typically, the detectors are arranged along a line and are scanned in a direction perpendicular to the line, the line of detectors providing the width of a swath being swept during a single line of scan.

In one application of considerable interest, the scene being imaged is viewed on a display wherein the scan lines are parallel to a horizontal axis of the display while the line of detectors are parallel to a vertical axis of the display. Typical subject matter of the foregoing scene would include both sky and land. As viewed by infrared detectors, the sky presents subject matter which is of a lower temperature than the subject matter presented by the land. Also included within the typical scene would be a subject of higher temperature, such as aircraft within the sky, and cooler subject matter such as a lake or river on the land. Buildings, roadways, trees and other foilage may also be present as further subject matter within the scene.

Subject matter in the foregoing portions of the scene emit infrared radiation at differing temperatures characteristic of the subject matter in response to illumination by the sun, or in response to some other source of heat. Each of the foregoing detectors produces an electric signal of varying amplitude dependent upon the temperature of the subject matter of the portion of the scene being viewed by the detector. The signals produced by the array of detectors are processed in individual detector channels and may be applied to a display for presentation of an image of the various objects in the scene being viewed.

In viewing the foregoing scene, the scanner is often oriented relative to the scene such that the line of scan would be parallel to the horizon. As a result, individual swath of the scene swept by corresponding ones of the detectors would be predominantly cool or predominantly warm depending on whether a detector was scanning a portion of the sky or a portion of the land. A swath which traversed a variety of subject matter, such as a building and foliage, or a building and a lake, would present an average temperature between that of the sky and that of the land.

To the construction of infrared imaging systems, it is common practice to employ AC coupling in each of the detector channels. Such coupling may be introduced by the use of a capacitively coupled amplifier in each channel. The AC coupling blocks the portion of a detector signal which is produced by background radiation and, thereby, prevents an overdriving of the amplifier. The exclusion of the background signal is advantageous in that such background signal carries no useful information with regard to an outline of a subject in the scene being imaged. Also, the elimination of the background signal permits the full dynamic range of the amplifier and any signal processing circuitry which may follow the amplifier to be applied to the subject matter of interest.

A problem arises in that, within the portion of detector signal carrying useful information about the subject matter, there may be a large range of signal dynamics. For example, a scanned receiving beam passing by a stone building heated by incident solar rays, and situated in a grassland, would produce a large infrared signal. The large infrared signal would be detected by a detector and applied to a capacitor of the capacitively coupled amplifier. Upon being coupled by the capacitor, the signal would be distored by a droop due to a partial charging of the capacitor which charging would also introduce a DC (Direct Current) level shift to the capacitor. Both effects are detrimental to a viewing of line detail in the subject, such as windows in the building. Thus, it is seen that the capacitor, while providing a benefit in eliminating background radiation, also introduces a problem in the viewing of fine detail due to the partial charging of the capacitor by large signals in the subject matter.

SUMMARY OF THE INVENTION

The foregoing problem is overcome and other advantages are provided by an imaging system including a radiation scanner having a set of detectors of the radiation. A set of individual amplifying channels connect with respective ones of the detectors, with output signals of the amplifying channels being applied to circuitry for the extraction of imaging data or providing an image of a subject scanned by the imaging system.

In accordance with the invention, each amplifying channel includes an AC coupled amplifier with signal conditioning circuitry which limits the magnitude of signals provided by the corresponding detector. The signal conditioning circuitry is formed as a feedback branch coupled between an output terminal of the amplifier and an output terminal of the detector. The feedback branch includes a diode and applies a limiting level through the diode for clamping the detector signal. A low pass filter contained within the feedback branch provides a frequency responsivity to the diode limiting action whereby the major portion of energy within a relatively large detector signal is attenuated while the high frequency components associated with fine subject detail are permitted to pass the amplifier. Thus, capacitors associated with the AC coupling do not receive excessive charge from the relatively large signals, nor does an excessive droop appear in the signals passed by the capacitors. As a result, the outline of large subject matter is visible on an output display of the imaging system and, in addition, the fine detail associated with the small subject matter is also visible on such display without being occluded by the presence of the relatively large signals. Therefore, a display image is substantially free of effects of saturation and streaking which might be produced by such large signals in the absence of the signal conditioning circuitry of the invention.

The theory of operation of the invention applies equally well to scanners of acoustic radiation as well as to scanners of other regions of the electromagnetic spectrum; therefore, while a preferred embodiment of the invention will be described with respect to infrared detectors, it is understood that an array of acoustic transducers incorporated and acoustic imaging system might also be utilized in illustrating the invention.

BRIEF DESCRIPTION OF THE DRAWINGS

The foregoing aspect and other features of the invention are explained in the following description taken in connection with a accompanying drawing wherein.

DETAILED DESCRIPTION

Figure 1:
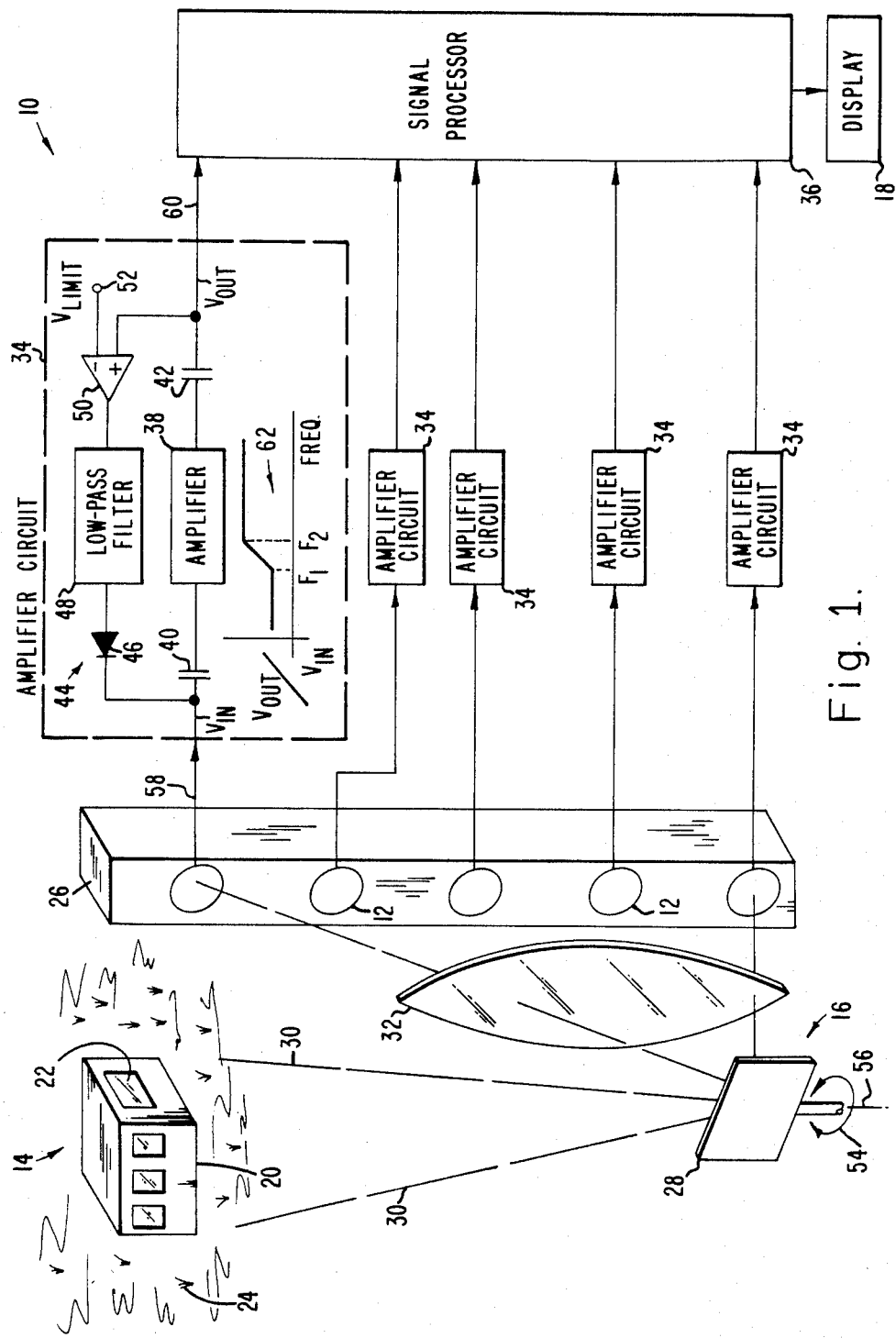
FIG. 1 is a block diagram of an imaging system incorporating signal conditioning circuitry of the invention in each detector channel.

FIG. 1 shows an imaging system 10 having an array of infrared detectors 12 which view radiation in a scene 14 via a scanner 16 for presenting an image of subject matter of the scene 14 upon a display 18. By way of example, the scene 14 is shown to comprise subject matter including a building 20 having windows 22 and being surrounded by grass 24. The detectors 12 are held in position by a support 26. The scanner 16 comprises a pivoting mirror 28 which scans infrared radiation, represented by dashed lines 30 from the scene 14 to the detector 12, the scanner 16 further comprising a lens 32 for focusing the radiation upon the detector 12.

In accordance with the invention, each of the detectors 12 provide an output signal in response to radiation incident thereupon, the output signal being coupled by an amplifier circuit 34 to a signal processor 36. The signals of each of the detectors 12 are separately amplified by corresponding detector channels, each of which comprises one of the foregoing amplifier circuits 34. Each detector 12 receives data of the subject matter of the scene 14, which data is communicated via the respective amplifier circuit 34 to the signal processor 36. The signal processor 36 may provide filtering and gain control, as one anode, for the signals of each of the detector channels, prior to application of the signals to the display 18. The display 18 may be a cathode-ray tube (CRT) or other suitable form of display, for presentation of scene data in either an analog or a digital format.

In accordance with a feature of the invention, each of the amplifier circuits 34 include an amplifier 38 which is AC coupled by capacitors 40 and 42 between a detector 12 and the processor 36. The amplifier 38 amplifies a detector signal to an amplitude suitable for operation of the circuitry of the processor 36.

The capacitors 40 and 42 block out a DC component associated with background radiation of the scene 14. Further signal conditioning is provided by a feedback branch 44 connected between the output terminal of the capacitor 42 and to the input terminal of the capacitor 40. As will be described subsequently with reference to FIGS. 2 and 3, the feedback branch 44 limits the magnitude of a relatively large signal provided by detector 12, so as to prevent such signal from overdriving the capacitors 40 and 42 and to prevent saturation of the amplifier 38, thereby to increase visibility of fine detail in the scene 14.

The feedback branch 44 comprises a diode 46, a low-pass filter 48, and a differential amplifier 50. In response to a signal provided by a amplifier 50 and filtered by the filter 48, the diode 46 acts to clamp the detector signal to a predetermined limit established by a source 52 of reference voltage which is preset to the desired limit to be applied to the signal of a detector 12.

By way of example in the operation of the signal conditioning function of the amplifier circuit 34, a relatively large signal would be generated by solar energy impinging upon the building 20. The building 20 is presumed to be constructed of stone which is heated by solar energy. As a received beam of radiation is scanned past the building 20, a relatively large signal is outputted by such ones of detectors 12 viewing a swath of the scene 14 swept out by the scanned beam.

By way of example of fine detail represented by relatively weak signals, the windows 22 of the building 20 are presumed to radiate radiation of a cooler temperature, the signals provided by individual ones of the windows 22 having a substantially shorter duration than that produced by the building 20 in response to the scanning of the received radiation beam by the scanner 16.

Both of the foregoing signals, namely the relatively large signal and the relatively small signal, are outputted by a detector 12 to the amplifier 38. It is recognized both the large signal and the small signal are present simultaneously. The small signal has relatively little energy content, and accordingly, in the electric current impressed through the capacitor 40 will have no more than an negligible effect in the generation of a stored charge and a corresponding DC voltage offset.

However, in the case of the relatively large signal pulse produced by radiation from the building 20, there is a relatively large amount of energy in such signal pulse which, upon being applied to the capacitor 40, introduces a significant amount of charge and corresponding DC voltage offset to the capacitor 40. Such voltage offsets may be many times larger than the voltage of the small signal and, if large enough to induce saturation of the amplifier 38, will tend to obscure visibility of the subject mater of the small signals. It is also noted that any charging of the capacitor 40, as well as the capacitor 42, results in a falling off of the signal pulse waveform, such falling off being referred to frequently as voltage "droop".

For ease of presenting a system 10 in FIG. 1, only a few of the detectors 12 are shown, as being understood that many more detectors are employed in a typical infrared imaging system. The scanning by the scanner 16 is accomplished, typically, in a horizontal plane by means of an oscillatory or rotary motion indicated by double-headed arrow line 54 about an axis 56 of pivot. Upon the oscillatory motion of the mirror 28, each scanned line is done in one direction followed by a retrace in the opposite direction which retrace returns the mirror 28 to its starting position for the next scan. The retrace time is efficiently fast, less than 10% of the scan interval, so as to have little effect upon the charging of the capacitor 40 and 42 by large signals from scene 14.

If desired, the scanner 16 may be provided with a well-known tilt mechanism (not shown) for tilting the mirror 28 during alternate sweeping of the scan paths so as to provide an interlace scan. During each cycle of the scanning, a detector 12 sweeps out a path which approximates a portion of the scenes swept out by a previous path. Even in the case wherein the system 10 is carried by a moving vehicle, the rate of scanning is sufficiently high to provide for multiple repetitions of a scanned region of the scene 14 by each of the detectors 12.

Figure 2:
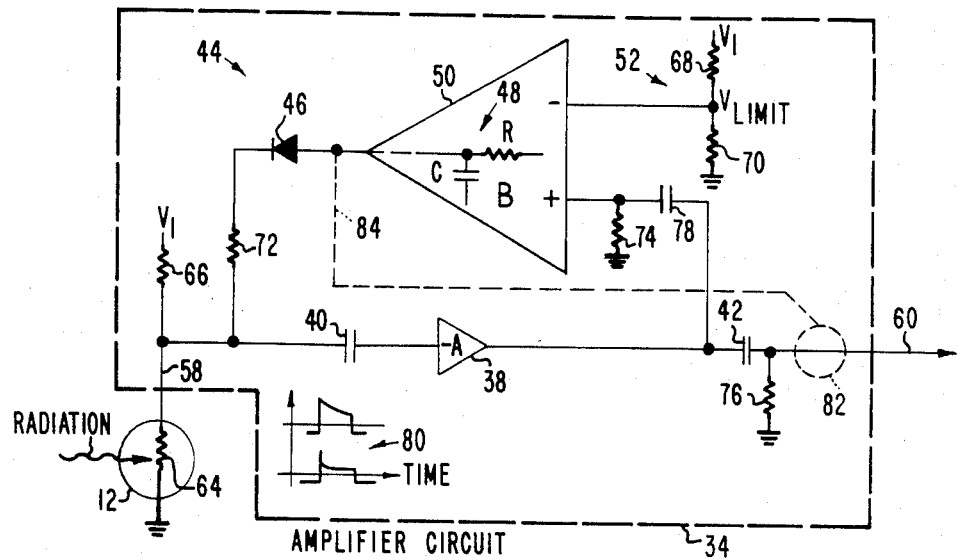
FIG. 2 is a schematic drawing of a detector amplifying channel including an AC coupled amplifier and a feedback branch including a diode for clamping a detector signal in accordance with the invention.
Figure 3:
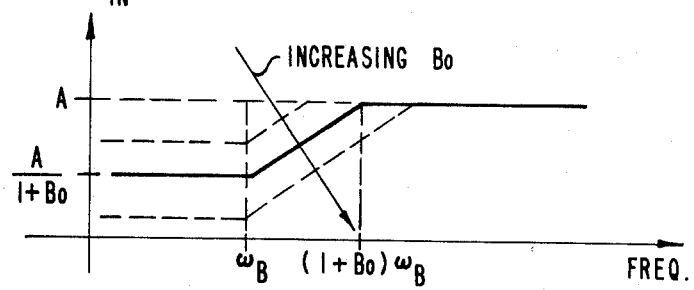
FIG. 3 is a graph showing the frequency response of the circuit of FIG. 2.

With reference also to FIGS. 2 and 3, a detector signal is applied as an input voltage via line 58 to an amplifier circuit 34, and exits the amplifier circuit 34 as an output voltage on line 60. In the construction of the amplifier circuit 34 the low-pass filter 48 may be applied as a separate circuit at the output of the amplifier 50, or may be incorporated directly within the circuitry of the amplifier 50 as portrayed in FIG. 2. The filter 48 may be a multipole filter if desired, however, good results have been obtained by the use of a single-pole filter composed of a series resistor R and a shunt capacitor C.

Due to the placement of the filter 48 within the feedback branch 44, the overall voltage transfer ratio of output voltage to input voltage of the amplifier circuit 34 is shown as two break points in the frequency characteristic as depicted in a graph 62 shown in FIG. 1 within the block of the circuit 34. The break points are located at frequencies F1 and F2. In particular, it is noted that the transfer function is relatively low for low values of frequency, less than F1, and rises to a relative high value or high frequencies, above F2.

In the derivation of the transfer function represented by the graph 62, the impedance of the capacitor 40 and 42 is presumed to be sufficiently low, over the frequencies of interest, such that the capacitances of the capacitors 40 and 42 need not be considered in the derivation. A feature of the transfer function is the fact that higher frequencies corresponding to fine detail in the subject matter in the scene 14 are accentuated while low frequency data, corresponding to the relatively large energy content of the foregoing large signal pulse, received from scanning the building 20, is minimized. By way of example, the windows 22 and edge lines of the building 20 are accentuated by the frequency characteristic depicted in the graph 62.

As shown in FIG. 2, the detector 12 is represented as a resistor 64 which is connected in series with a resistor 66 between ground and a source of voltage V1. Radiation incident upon the detector 12 changes the value of resistance of the resistor 64. In response to the changing resistance, a signal voltage appears on line 58 at the input to the amplifier circuit 34.

The source 52 of the reference voltage is composed of a voltage divider comprising resistors 68 and 70 serially connected between ground and the voltage source V1. The circuit 34 further comprises resistor 72, 74, and 76, and a capacitor 78. The resistor 72 protects the detector 26 from excessive current drive through the diode 46 when the diode 46 is clamping the signal voltage on line 58. The resistor 74 connects between the positive input terminal of the amplifier 50 and ground, and cooperates with the capacitor 78 which couples the output terminal of the amplifier 38 to the positive input terminal of the amplifier 50 for connecting the feedback branch 44 to the amplifier 38.

The resistor 76 connects between the output terminal of the capacitor 42 and ground to aid in the coupling of signals from the output terminal of the amplifier 38 to line 60.

The effect of the feedback branch 44 and the signal conditioning is demonstrated by a graph 80 adjacent the amplifier 38 in FIG. 2. The graph 80 includes two traces, the upper trace bearing the input voltage coupled via the capacitor 40 to an input terminal of the amplifier 38 in the absence of the clamping action of the diode 46. The lower trace shows the corresponding voltage in the presence of the clamping action of the diode 46.

The magnitude of the voltage portrayed by the graph 80 is substantially reduced by the clamping action throughout the pulse duration except for the leading edge of the pulse, as is shown in the lower trace. The reduced clamping action is due to a delay in the response time of the feedback branch 44, which delay is imparted by the low-pass filter 48. This delay permits the circuit 44 to respond to high frequency components of the detector signal, thereby to present fine detail of the scene 14 upon the display 18.

In operation, the amplifier 38 provides a gain of value A, in the forward direction while the amplifier 50 provides a gain, of value B, in the feedback direction. For a value of output voltage of the amplifier 38 which is less than that of the limit voltage of the source 52 applied to the negative input terminal of the amplifier 50, the output voltage of the amplifier 50 back biases the diode 46 relative to the voltage on line 58, thereby maintaining the diode 46 in a state of non-conduction. As the output voltage of the amplifier 38 rises up to the limit voltage and exceeds the limit voltage, the amplifier 50 places the diode 46 into a state of conduction which clamps the voltage on line 58 so as to prevent further decreases thereof. This results in the modification of the signal waveform as described in graph 80.

By way of alternative embodiments, it is noted that a gate 82, indicated in phantom, may be placed in line 60 at the output of the circuit 34, the gate being operated by a signal on line 84 from the output terminal of the amplifier 50. By way of example, the gate 82 may be fabricated as a field effect transistor (not shown) where the gate terminal is being operated by the signal on line 84. The effect of the gate 84 is to momentarily disconnect the signal on line 60 in the event that a large transient appears in the output signal of the amplifier 38, such as the peak value of the lower trace at the leading edge of the pulse. Thereby, in the event that the low-pass filter 48 permits an excess value of transient to be applied to the amplifier 38, and line 84 obtains its signal prior to filter 48, the gate 82 would prevent such transient from being passed onto such further signal processing circuitry as may be provided in the signal processor 36.

The operation of the system 10 may be further understood with reference to the following mathematical expressions wherein the forward gain of the amplifier 38 is considered to be a constant A over a frequency band of interest, and the feedback gain of the amplifier 50 including the filter 48 is given by $$B = \left(\frac{B_o}{A}\right)\left(\frac{1}{RCS + 1}\right) = \left(\frac{B_o}{A}\right)\left(\frac{\omega_B}{S + \omega_B}\right) \quad (1)$$

where the radian frequency $\omega_B = 1/RC$, S is the Laplace operator, and $B = B_o/A$ at zero frequency.

The output voltage is given in terms of the input voltage and the limit voltage as $$V_{OUT} = \left[\frac{-A}{1 + AB}\right] V_{IN} + \left[\frac{AB}{1 + AB}\right] V_{LIM} \quad (2)$$

Substituting the expression for B, from equation (1), into equation (2) gives $$V_{OUT} = -A\left[\frac{S + \omega_B}{S + (1 + B_o)\omega_B}\right] V_{IN} + \left[\frac{B_o \omega_B}{S + (1 + B_o)\omega_B}\right] V_{LIM} \quad (3)$$

The initial output voltage is obtained by taking the limit $$\text{LIMIT } [V_{OUT}]/S \to j\omega \to \infty = -A\, V_{IN} \quad (4)$$

The final output voltage is obtained by taking the limit $$LIM\, [V_{OUT}]/S \to j\omega \to 0 = \left(\frac{-A}{1 + B_o}\right) V_{IN} + \left(\frac{B_o}{1 + B_o}\right) V_{LIM} \quad (5)$$

In the limited mode of operation, wherein a large signal component of the detector 12 has caused the output voltage of the amplifier 38 to exceed the limit voltage of the source 52, the small signal transfer function $V_{OUT}/V_{IN}$ is given from the first term in equation (3), and is plotted in the graph of FIG. 3. Therein, it is readily seen that the parameters $B_o$ and $\omega_B$ may be selected to produce a desired emphasis of higher frequency components and de-emphasis of lower frequency components in the signal outputted by a detector 12.

It is to be understood that the described embodiments of the invention are illustrative only, and that modifications thereof may occur to those skilled in the art. Accordingly, this invention is not to be regarded as limited to the embodiments disclosed herewith, but is to be limited only as defined by the appended claims.

What is claimed is:

1. An imaging system comprising:
    means for scanning radiation from a subject to be imaged, said scanning means including a set of detectors of the radiation;
    a set of amplifying circuits connected by AC coupling to corresponding ones of said detectors; and
    means coupled to said amplifying circuits for extracting imaging data to provide an image of said subject;
    said amplifying circuits each including means for limiting the magnitude of an output signal of said corresponding one of said detectors, and a feedback branch for operating said limiting means to limit a signal amplitude of said one detector to a preset limit value.

2. A system according to claim 1 wherein said feedback branch includes a low-pass filter for delaying operation of said limiting means a sufficient amount of time to pass a higher frequency component of said one detector signal while limiting a lower frequency component of said one detector signal.

3. An imaging system comprising:
    means for scanning radiation from a subject to be imaged, said scanning means including a set of detectors of the radiation;
    a set of amplifying circuits connected by AC coupling to corresponding ones of said detectors; and
    means coupled to said amplifying circuits for extracting imaging data to provide an image of said subject; wherein
    each of said amplifying circuits comprises means for limiting the magnitude of an output signal of one of said detectors, and a feedback branch for operating said limiting means to limit a signal amplitude of said one detector to a preset limit value;
    said feedback branch includes a low-pass filter for delaying operation of said limiting means a sufficient amount of time to pass a higher frequency component of said one detector signal while limiting a lower frequency component of said one detector signal; and
    said limiting means comprises a diode in an output circuit of said feedback branch, said diode connecting with an output signal line of said one detector.

4. A system according to claim 3, wherein each of said amplifying circuits includes an amplifier for amplifying signals propagating in an forward-direction, the combination of said forward-direction amplifier with feedback branch introducing a voltage transfer characteristic to each of said amplifying circuits characterized by a frequency dependency having two break points.

5. A system according to claim 4 wherein said voltage transfer characteristic accentuates frequency components of said one detector signal having higher frequency components and de-emphasizes lower frequency components of said one detector signal.

6. In a scanning system employing a set of detectors for scanning radiation of a subject to produce an image thereof, a signal conditioner system for enhancing a display of relatively small elements of said subject in the presence of relatively large elements of said subject comprising:
    a set of amplifying circuits connected by AC coupling to corresponding ones of said detectors; and wherein
    said amplifying circuits each includes means for limiting the magnitude of an output signal of said corresponding one of said detectors, and a feedback branch for operating said limiting means to limit a signal amplitude of said one detector to a preset limit value.

7. In a scanning system employing a set of detectors for scanning radiation of a subject to produce an image thereof, a signal conditioner system for enhancing a display of relatively small elements of said subject in the presence of relatively large elements of said subject comprising:
    a set of amplifying circuits connected by AC coupling to corresponding ones of said detectors; wherein
    each of said amplifying circuits comprises means for limiting the magnitude of an output signal of one of said detectors, a feedback branch for operating said limiting means to limit a signal amplitude of said one detector to a preset limit value,
    a forward amplifier for amplifying signals conducted in the forward direction, a feedback amplifier disposed in said feedback branch for amplifying signals conducted in the feedback direction, and an input terminal of said feedback amplifier being coupled to an output terminal of said forward amplifier, said limiting means being connected between an output terminal of said feedback amplifier and an output signal line of said one detector; and wherein said feedback branch further comprises a filter having at least one pole for providing an overall frequency characteristic to a voltage transfer function in each of said amplifying circuits which accentuate high frequency components of said one detector signal and de-emphasize low frequency components of said one detector signal.

8. A system according to claim 7 wherein said filter and said feedback branch introduces a delay to an operation of said limiting means to permit a signal component representing a fine detail in said subject to pass through said forward amplifier with substantially less limiting than is applied to a portion of said one detector signal representing a relatively large component of said subject.

9. A system according to claim 8 wherein said forward amplifier is AC coupled to said one detector.

* * * * *